(12) United States Patent
Mitchell et al.

(10) Patent No.: US 8,074,674 B2
(45) Date of Patent: Dec. 13, 2011

(54) BLOCK FOR CHEMICALLY DOSING A STREAM OF FLUID AND AN APPARATUS FOR HOUSING THE BLOCK

(75) Inventors: Grant Mitchell, Warana (AU); Andrew Geue, Mooloolaba (AU); Periklis Christodoulou, Forest Lake (AU)

(73) Assignee: Quik Corp Fire Pty Ltd., Warana, Queensland (AU)

( * ) Notice: Subject to any disclaimer, the term of this patent is extended or adjusted under 35 U.S.C. 154(b) by 0 days.

(21) Appl. No.: 12/444,310

(22) PCT Filed: Oct. 5, 2007

(86) PCT No.: PCT/AU2007/001511
§ 371 (c)(1),
(2), (4) Date: Jul. 21, 2009

(87) PCT Pub. No.: WO2008/040091
PCT Pub. Date: Apr. 10, 2008

(65) Prior Publication Data
US 2009/0301741 A1 Dec. 10, 2009

(30) Foreign Application Priority Data
Oct. 5, 2006 (AU) .................................. 2006905500

(51) Int. Cl.
*B01D 11/02* (2006.01)
(52) U.S. Cl. .......................................... 137/268; 422/264
(58) Field of Classification Search .................. 137/268; 422/256, 264, 282; 210/206, 209; 169/51; 252/2, 3
See application file for complete search history.

(56) References Cited

U.S. PATENT DOCUMENTS

| | | | |
|---|---|---|---|
| 3,856,932 A | 12/1974 | May | |
| 3,959,176 A | 5/1976 | Mahn et al. | |
| 4,054,518 A | 10/1977 | Gould | |
| 4,434,136 A * | 2/1984 | Wilkinson, III et al. | 422/263 |
| 4,545,917 A * | 10/1985 | Smith et al. | 137/268 |
| 4,569,781 A * | 2/1986 | Fernholz et al. | 510/225 |
| 4,572,235 A | 2/1986 | Katzer et al. | |
| 4,876,003 A | 10/1989 | Casberg | |
| 4,928,813 A | 5/1990 | Casberg | |
| 5,198,198 A * | 3/1993 | Gladfelter et al. | 422/264 |
| 5,262,132 A * | 11/1993 | Bricker et al. | 422/263 |
| 5,389,345 A | 2/1995 | Renton | |
| 5,958,334 A * | 9/1999 | Haddon | 422/5 |
| 6,649,050 B1 * | 11/2003 | Cerny et al. | 137/268 |
| 6,676,908 B2 * | 1/2004 | Robinson et al. | 137/268 |
| 7,250,086 B2 * | 7/2007 | Furber et al. | 134/18 |
| 7,581,558 B2 * | 9/2009 | Martin et al. | 137/268 |

FOREIGN PATENT DOCUMENTS

| | | |
|---|---|---|
| FR | 2722577 A1 | 1/1996 |
| FR | 2750722 A1 | 1/1998 |
| GB | 1229081 | 4/1971 |
| WO | 0003763 | 1/2000 |

\* cited by examiner

*Primary Examiner* — Kevin Lee
(74) *Attorney, Agent, or Firm* — Ward and Smith, P.A.

(57) ABSTRACT

A block for chemically dosing a stream of fluid flowing past the block, the block comprising at least one surface for the fluid to flow past to dissolve and/or erode the block, wherein the block is shaped to enable the at least one surface to be dissolved and/or eroded without a substantial change in the area of the at least one surface.

19 Claims, 4 Drawing Sheets

BLOCK FOR CHEMICALLY DOSING A STREAM OF FLUID AND AN APPARATUS FOR HOUSING THE BLOCK

FIELD OF THE INVENTION

The present invention relates to chemically dosing a stream of fluid. The present invention also relates to an apparatus used in chemically dosing a stream of fluid.

BACKGROUND OF THE INVENTION

There are numerous applications where chemicals, dissolved or suspended in a fluid, are required to be applied over large areas or volumes.

One such application is in fire fighting, where fire retardant foam may sometimes be employed to smother a fire, particularly in the case of electrical fires or flammable liquid fires (such as oil fires) in which water is not a suitable fire extinguishing material.

The chemical components of the fire retardant foam are typically dissolved or suspended in water, the foam readily forming as the water and chemicals are sprayed out of a nozzle. The primary component of the fire retardant foam is a surfactant, which readily foams when sprayed out of the nozzle. The concentration of the surfactant in the water is typically less than 1%. Some types of surfactants employed include synthetic surfactants such as alpha-olefin sulfonates, perfluorooctane sulfonate, perfluorooactanoic acid and protein based surfactants. Other components of fire retardant foams may include organic solvents such as trimethyltrimethylene glycol and hexylene glycol, foam stabilisers such as lauryl alcohol and corrosion inhibitors.

For hand held fire extinguisher cylinders, the foam components and water are held in a compressed volume, similar to the arrangement in an aerosol can. When operated, the compressed gas which compresses the water and foam components escapes through a valve, causing the application of a pressure on the water, driving it out of the cylinder through a nozzle. As this occurs, the foaming components form the foam.

For fire trucks, having a foam system, a foam tank containing water and the foam components is provided on board the fire truck. In this instance, however, the pressure required to drive the water carrying the foam components through a nozzle to form the foam is provided by the fire truck's onboard pump.

Although both these arrangements enable an operator to apply a controlled concentration of chemicals to produce a fire retardant foam, a significant disadvantage is that large volumes of water and these chemicals are required to be stored.

In more recent developments, solid blocks containing surfactants supported in a polyethylene glycol matrix have been employed to create fire retardant foams by placing the solid blocks in the path of a stream of water. Typically, the block is housed in a chamber at some point between a water source and a nozzle. As the stream of water passes around the block in the chamber, the block including the surfactant dissolves and/or erodes into the fluid. The rate of loss of material from the block is directly proportional to the exposed surface area of the chemical block. The fluid, now containing surfactant, may flow through a nozzle to create the fire retardant foam. A significant advantage of this arrangement is that it is not necessary to provide a large storage tank of water containing the foaming compounds. However, a noticeable problem in relation to such solid blocks is that the loss of material from the blocks into the fluid does not occur evenly over the surface of the block over time. It has been found that this problem causes a rapid reduction in the concentration of foaming agents in the fluid. It is consequently necessary to regularly replace the solid block in the chamber, without a substantial portion of the solid block having been used, in order to maintain the required concentration.

Another application where chemicals dissolved or suspended in a fluid need to be applied over a large area or volume is in the application of agricultural products such as fertilisers, pesticides, insecticides and herbicides. Such chemicals may be made up into a solution and sprayed over the necessary area using an irrigation system or a hose for example. Again, one problem with this arrangement is that it requires storage of large volumes of chemical containing solution. Furthermore, such chemicals can be difficult to handle when in liquid form.

In a further application, cleaning apparatus for cleaning cars and other vehicles may have accessories which enable a liquid detergent concentrate to be added to a stream of water to assist in the cleaning process. The detergent is added by flowing the water past an opening to a volume of the detergent through the opening and, which draws some of the detergent out into the water under a "venturi" effect.

SUMMARY OF THE INVENTION

According to a first aspect of the present invention, there is provided a block for chemically dosing a stream of fluid flowing past the block, the block comprising at least one surface for the fluid to flow past to dissolve and/or erode the block, wherein the block is shaped to enable the at least one surface to be dissolved and/or eroded without a substantial change in the area of the at least one surface.

In an embodiment, the at least one surface is substantially flat.

In an embodiment, the at least one substantially flat surface of the block is of any suitable shape, such as rectangular, triangular, circular or hexagonal for example, however, preferably it is rectangular.

In another embodiment, the block comprises two substantially flat surfaces, parallel to one another.

In this embodiment, both substantially flat surfaces are for flowing the stream of fluid to flow past.

In an embodiment, the block comprises opposing side walls extending between the two substantially flat surfaces.

In an embodiment, the block comprises opposing end walls extending between the two substantially flat surfaces and between the opposing side walls.

In an embodiment, the block is of any suitable shape provided that as the at least one substantially flat surface dissolves/erodes, the effective surface area which is dissolving/eroding does not substantially change.

In an embodiment, the block is a rectangular prism.

In an embodiment, the surface(s) for the fluid to flow past is an outer surface(s) of the rectangular prism.

In another embodiment, the block is a hollow rectangular prism and the at least one surface for the fluid to flow past is the inner surfaces of the hollow rectangular prism.

The composition of the block is dependent on the application for which it is to be used.

In an embodiment, the block consists of one or more active ingredients and a solid carrier for carrying the one or more active ingredients.

In an embodiment, the active ingredients are evenly distributed throughout the solid carrier matrix.

Preferably, the solid carrier is soluble in water.

In an embodiment, a suitable solid carrier is polyethylene glycol. However, the solid carrier may be any other suitable substance for carrying the active ingredients.

In an embodiment, the polyethylene glycol has an average molecular weight of between 1000 and 8000 MW.

In an embodiment, the one or more active ingredients comprise at least one surfactant for a fire fighting application.

In an embodiment, the surfactants are for forming a fire retardant foam.

In an embodiment, the one or more active ingredients comprise a foam stabiliser.

In an embodiment, the one or more active ingredients comprise a corrosion inhibitor.

In another embodiment, the one or more active ingredients comprise at least one detergent for a cleaning application.

In yet another embodiment, one or more active ingredients comprise any one or more compounds selected from the group consisting of fertilisers, pesticides, insecticides and herbicides for an agricultural or a gardening application.

According to a second aspect of the present invention, there is provided an apparatus for housing a block for chemically dosing a stream of fluid flowing past the block, by dissolution and/or erosion of the block, the apparatus comprising a chamber for the block to reside in, the chamber having an inlet and an outlet to enable the stream of fluid to flow therethrough.

In an embodiment, the block is the block according to the first aspect of the present invention.

In an embodiment, the chamber is arranged to provide a substantially constant concentration of chemicals in the fluid at its outlet for a given flowrate when the block resides therein.

Preferably, the shape of the chamber is generally the same as the shape of the block.

In an embodiment, the chamber is rectangular in shape.

The chamber is preferably arranged to house the block whereby, in use, only the at least one surface of the block which does not substantially change in area as it dissolves and/or erodes is exposed to the flow of fluid.

In an embodiment where the block comprises two substantially flat surfaces, the chamber is shaped to enable the block to reside therein with its opposing side walls snugly abutting the side walls of the chamber.

Preferably, the chamber is shaped so that the opposing side walls of the block cannot dissolve and/or erode in use, when the block resides in the chamber.

In an embodiment, the chamber is arranged so that, in use, fluid entering and exiting the chamber does not significantly dissolve and/or erode the opposing end walls of the rectangular block.

In an embodiment, the chamber is shaped to enable the at least one surface of the block to be positioned approximately perpendicular to the side walls of the chamber when the block resides therein.

In this embodiment, the chamber is preferably shaped to provide a space next to the at least one surface of the block for the stream of fluid to flow through when the block resides therein.

In an embodiment where the block comprises two substantially flat surfaces, the chamber is shaped to provide spaces next to the respective surfaces of the block when it resides therein for the stream of fluid to flow through.

In this embodiment, the apparatus also comprise a regulating mechanism, which regulates flow of the fluid to enable flow to one or both of the spaces next to the surfaces respectively in order to vary the concentration of the chemicals in the dosed fluid exiting the apparatus.

By "next to" it is understood that the space(s) may be above, below or beside the at least one surface(s) of the block.

In an embodiment, the apparatus also comprises a retaining mechanism for holding the block in position in the chamber.

In an embodiment, the retaining mechanism comprises an opposing pair of ridges formed on the side walls of the chamber for engaging corresponding grooves formed in the opposing side walls of the block.

In another embodiment, the retaining mechanism comprises an opposing pair of grooves formed in the side walls of the chamber for receiving corresponding ridges formed on the opposing side walls of the block.

The apparatus also comprises an inlet and an outlet. In an embodiment, the inlet and the outlet of the chamber are fluidly connected to the inlet and the outlet of the apparatus respectively.

In an embodiment, the apparatus also comprises a bypass for allowing some or all of the fluid stream to bypass the chamber.

In an embodiment, the bypass is fluidly connected to the inlet and the outlet of the apparatus.

In an embodiment, the apparatus also comprises a baffle wall for separating the chamber from the bypass.

In an embodiment, the baffle wall forms one side of the chamber.

In an embodiment, the apparatus also comprises a bypass regulator for regulating the flow of fluid through the bypass.

In an embodiment, any fluid flowing through the bypass is used to dilute the fluid from the outlet of the chamber which has been chemically dosed by the block.

In an embodiment, the apparatus also comprises a mixing well, located prior to the outlet of the apparatus for mixing fluid from the bypass and the chemically dosed fluid from the outlet of the chamber.

The bypass regulator may be any suitable mechanism, but preferably is a two-way valve.

The bypass regulator may be infinitely or discretely variable from zero flow through the bypass to 100% flow through the bypass.

In an embodiment, the apparatus also comprises a removable end cap for access to the chamber.

The removable end cap may be readily removed to enable the block to be inserted or removed and a new block inserted.

In an embodiment, the apparatus also comprises a non-return valve located in the outlet of the chamber.

Preferably, the non-return valve prevents any flow of fluid from the bypass into the chamber through the chamber's outlet.

The apparatus may be hand held or mounted to a skid, or fixed permanently to a truck (or other vehicle) or the ground.

In an embodiment, the apparatus is manufactured from any suitable plastic or metallic material or a combination thereof.

BRIEF DESCRIPTION OF THE DRAWINGS

Embodiments of the present invention will now be described, by way of example only, with reference to the accompanying drawings, in which.

DETAILED DESCRIPTION OF EMBODIMENTS

Figure 1:
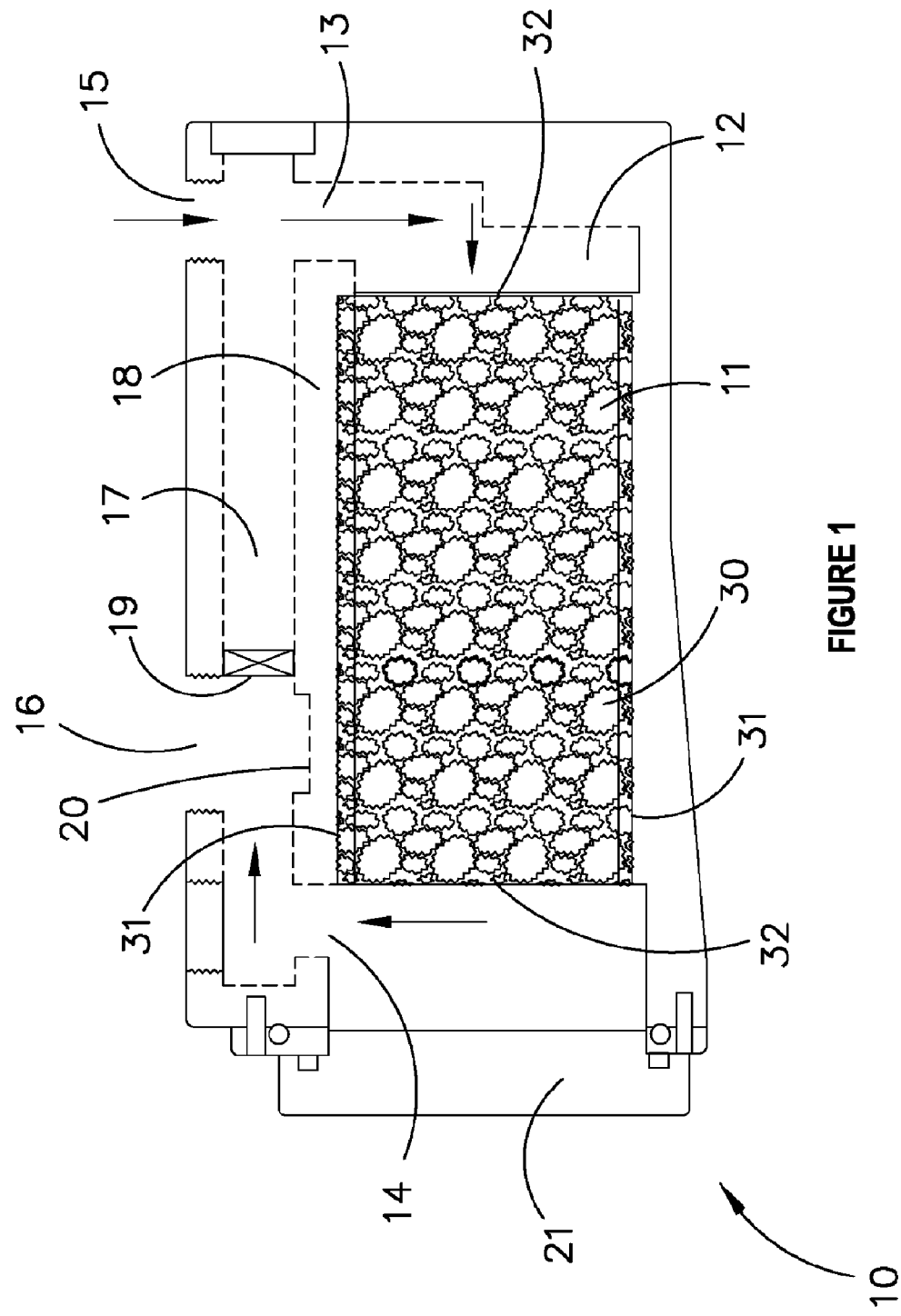
FIG. 1 is a side view of an apparatus for housing a block for chemically dosing a stream of fluid according to an embodiment of the present invention, with a bypass regulator of the apparatus arranged to allow the fluid to flow through a chamber in which the block resides.
Figure 2:
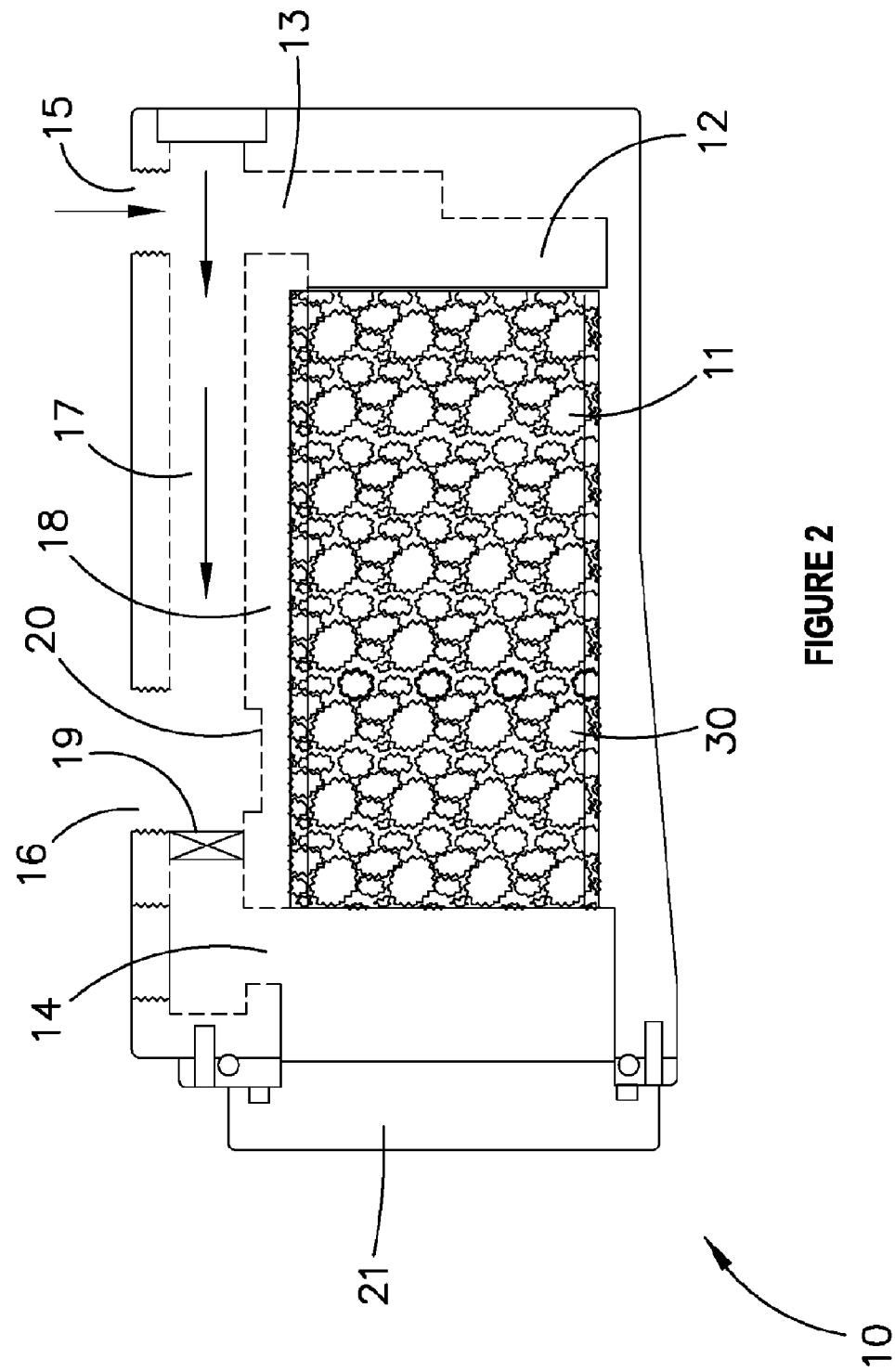
FIG. 2 is a side view of the apparatus of FIG. 1, with the bypass regulator arranged to bypass the fluid past the chamber.

Referring firstly to FIGS. 1 and 2, an apparatus 10 for housing a block 11 for chemically dosing a stream of fluid according to an embodiment of the present invention is shown. The stream of fluid flows past the block 11 (by flowing through the apparatus 10), the block 11 chemically dosing the stream of fluid by dissolving and/or eroding into the fluid.

The block 11 comprises at least one surface 30 for the fluid to flow past to dissolve and/or erode the block 11, wherein the block 11 is shaped to enable the at least one surface 30 to be dissolved and/or eroded without a substantial change in the area of the at least one surface 30. Because the surface area of the block 11 which dissolves and/or erodes does not change, this enables the block 11 to provide a constant rate of chemical dosing to the fluid for a given flowrate of the fluid past the surface 30 of the block 11 for a substantial portion of the working life of the block 11.

The at least one surface 30 of the block 11 shown in FIGS. 1 and 2 comprises two substantially flat surfaces, parallel to one another, in which case the block 11, in use, may be arranged to enable the stream of fluid to flow over both substantially flat surfaces. The block 11 also comprises opposing side walls 31 extending between the two substantially flat surfaces 30.

However, it is to be understood that the block 11 may have only one substantially flat surface for flowing the fluid over.

The substantially flat surface(s) 30 enable the block 11 to provide a constant rate of chemical dosing to the fluid for a given flowrate because as the block 11 dissolves and/or erodes, the effective surface area of the block 11 which is dissolving/eroding does not substantially change. The flat surface(s) 30 of the block 11 may be of any suitable shape, such as rectangular, triangular, circular or hexagonal for example, however, preferably it is rectangular.

The block 11 itself may be of any suitable shape provided that as the at least one surface dissolves/erodes, the effective surface area which is dissolving/eroding is not substantially reduced. Although the block 11 may be of any suitable shape, preferably it is a rectangular prism.

The composition of the block 11 is dependent on the application for which it is to be used. The block 11 may consist of surfactants for fire fighting applications, detergents for cleaning applications or fertilisers, pesticides, insecticides or herbicides for agricultural or gardening applications or any other one or more active ingredients as desired.

In any of these applications, the block 11 also consists of a solid carrier for carrying the one or more active ingredients of the block 11, which in the case of the fire fighting application is the surfactant(s). The surfactant(s) or other active ingredients are evenly distributed throughout the solid carrier matrix. A suitable solid carrier is polyethylene glycol having an average molecular weight of between 1000 and 8000 MW. However, any other suitable substance may be employed as the solid carrier, which is preferably water soluble.

The one or more active ingredients may also comprise a foam stabiliser(s) and may also comprise a corrosion inhibitor(s). The stream of fluid is dosed with the surfactant(s) and any other chemicals present in the block 11, as the block 11, including the solid carrier, dissolves and/or erodes into the fluid flowing over the surfaces 30 of the block 11.

The apparatus 10 comprises a chamber 12 for the block 11 to reside in. The chamber 12 has an inlet 13 and an outlet 14 to enable the stream of fluid to flow through the chamber 12. The chamber 12 houses the block 11 such that, in use, only the surfaces 30 of the block 11 which do not substantially change in area as they dissolve and/or erode are exposed to the flow of fluid.

The chamber 12 is shaped so that the block 11 resides therein with its opposing side walls 31 snugly abutting the side walls of the chamber 12. Thus, the substantially flat surfaces 30 of the block 11 are approximately perpendicular to the side walls of the chamber 12. The snug abutment of the opposing side walls 31 of the block 11 against the side walls of the chamber 12 prevent the opposing side walls 31 from being eroded and/or dissolved because fluid cannot flow past the opposing side walls 31. If this were to occur then it could cause a reduction in the surface area of the substantially flat surfaces 30 of the block 11, which in turn would reduce the rate of dosing by the block 11.

The chamber 12 is also shaped to provide a space next to the substantially flat surfaces 30 of the block 11 for the stream of fluid to flow through and past the surfaces 30 when the block 11 resides therein. In order to hold the block 11 in position in the chamber 13 so that the space next to the each of the substantially flat surfaces 30 are maintained, the apparatus 10 is also provided with a suitable retaining mechanism. In one embodiment (not shown), the retaining mechanism comprises an opposing pair of ridges formed on the side walls of the chamber 12. The opposing pair of ridges are shaped to engage corresponding grooves formed in the opposing side walls 31 of the block 11. In a variation (also not shown), the retaining mechanism comprises an opposing pair of grooves formed in the side walls of the chamber 12 which are shaped for receiving corresponding ridges formed on the opposing side walls 31 of the block 11.

The chamber 12 is preferably arranged to provide a substantially constant concentration of chemicals in the fluid at its outlet 14 for a given flowrate when the block 11 resides therein. However, in a variation, the apparatus 10 may also comprise a regulating mechanism, which regulates flow of the fluid to enable flow to one or both of the spaces next to the surfaces 30 respectively in order to vary the concentration of the chemicals in the dosed fluid exiting the apparatus 10.

The chamber 12 is also arranged so that fluid entering and exiting the chamber 12 does not significantly dissolve and/or erode the opposing end walls 32 of the rectangular block 11. The end walls 32 extend between the substantially flat surfaces 30 and between the opposing side walls 31. As with the opposing side walls 31, it is highly desirable to substantially prevent dissolution and/or erosion of the end walls 32 so as to avoid causing any significant reduction in the surface area of the substantially flat surfaces 30.

The apparatus 10 also comprises an inlet 15 and an outlet 16. The inlet 13 and the outlet 14 of the chamber are fluidly connected to the inlet 15 and the outlet 16 of the apparatus 10 respectively. The outlet 16 of the apparatus 10 may be fluidly connected to a hose, sprinkler or other suitable delivery mechanism. The apparatus 10 also comprises a bypass 17 for allowing some or all of the fluid stream to bypass the chamber 12. The bypass 17 is fluidly connected to the inlet 15 and the outlet 16 of the apparatus 10.

The apparatus 10 also comprises a baffle wall 18. The baffle wall 18 separates the chamber 12 from the bypass 17. In the embodiment shown in the figures, the baffle wall 18 forms one side of the chamber 12.

The apparatus 10 also comprises a bypass regulator 19 for regulating the flow of fluid through the bypass 17. This enables an operator to vary the concentration of the chemicals in the dosed fluid exiting the apparatus 10. Any fluid flowing through the bypass 17 is used to "dilute" the fluid from the outlet 14 of the chamber 12 which has been chemically dosed by the block 11. The apparatus 10 also comprises a mixing well 20, located prior to the outlet 16 of the apparatus 10, in which fluid from the bypass 17 and chemically dosed fluid from the outlet 14 of the chamber 12 are mixed prior to exiting the apparatus 10.

The bypass regulator 19 may be any suitable mechanism, but preferably is a two-way valve. The bypass regulator 19 may be infinitely or discretely variable from zero flow through the bypass 17 (as in FIG. 1) to 100% flow through the bypass 17 (as in FIG. 2). This is particularly advantageous for fire fighting applications as it enables a fire fighter to readily switch between spraying foam and water only from the same hose without having to disconnect the apparatus from the hose. Control of the bypass regulator 19 is thus preferably provided in a hand held device, which may be the apparatus 10 itself or may be device, remote from the apparatus 10.

The apparatus 10 also comprises a removable end cap 21 for ready access to the chamber 12. The removable end cap 21 may be readily removed to enable the block 11 to be inserted or removed and a new block inserted.

Although not shown in the Figures, the apparatus 10 may also comprise a non-return or one-way valve located in the outlet 14 of the chamber 12. The non-return valve prevents any flow of fluid from the bypass 17 into the chamber 12 through the chamber's outlet 14. Fluid may only through the non-return valve in the chamber's outlet 14 to exit the chamber 12. Advantageously, this enables continuous flow of fluid through the apparatus 10 whilst replacing the block 11 in the chamber 12 with a new block. With the bypass regulator 19 closing off the inlet 13 to the chamber 12, fluid flows solely through the bypass 17 and cannot "backflow" into the chamber 12 through the chamber's outlet 14 because of the non-return valve therein. Whilst this is occurring, the end cap 21 may be removed and the new block inserted. This is particularly important in fire-fighting applications of the apparatus 10, where it would be highly undesirable to have to stop the flow of water through the apparatus 10 (and onto a fire) in order to replace the block 11.

The apparatus 10 may be hand held or mounted to a skid, or fixed permanently to a truck (or other vehicle) or the ground. The apparatus 10 may be manufactured from any suitable plastic or metallic material or a combination thereof.

Figure 4:
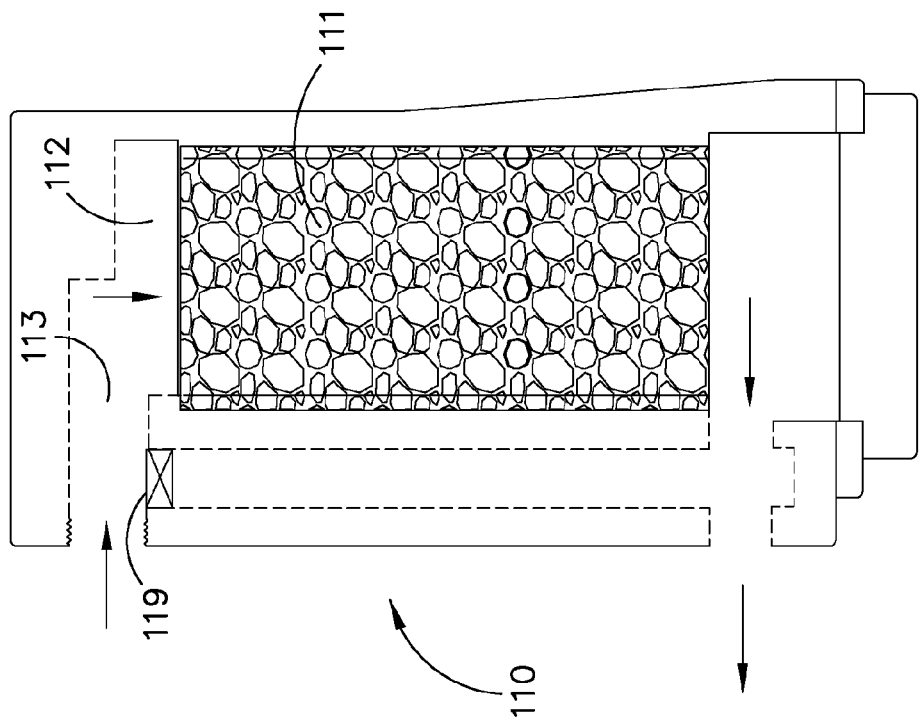
FIGS. 3 and 4 are side views of an apparatus for housing a block for chemically dosing a stream of fluid according to another embodiment of the present invention.
Figure 3:
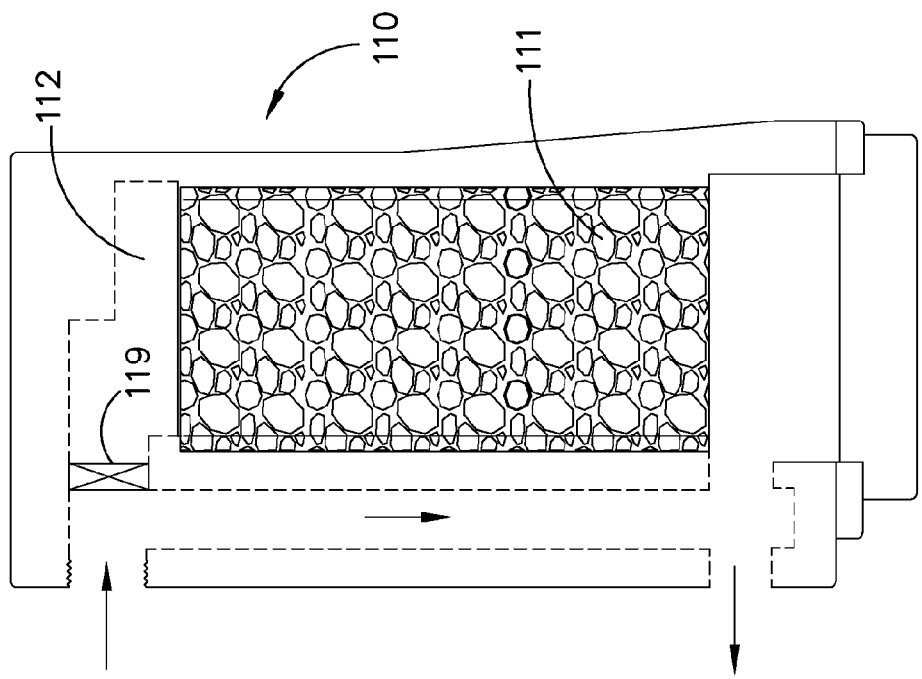
Figure 5:
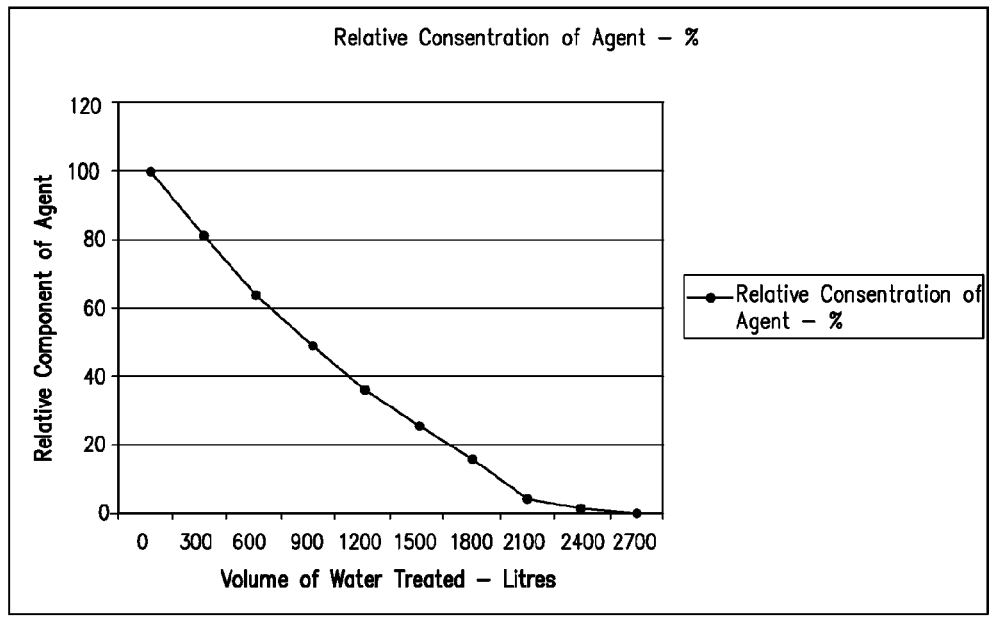
FIGS. 5 and 6 are graphs comparing the performance of a conventional block for chemically dosing a stream of fluid against a block according to an embodiment of the invention.
Figure 6:
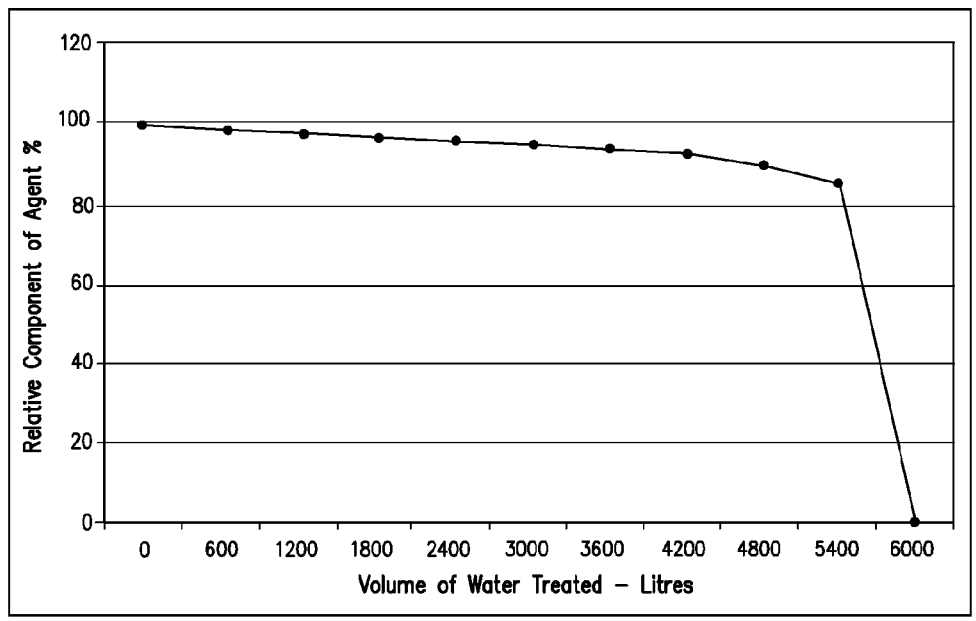

Referring now to FIGS. 3 and 4, an apparatus 110 for housing a block ill for chemically dosing a stream of fluid according to another embodiment of the present invention is shown. The apparatus 110 is similar to the apparatus 10 shown and described in relation to FIGS. 1 and 2. Similar features of the apparatus 110 have been given the same reference number, but have been prefixed with the numeral 1.

For the apparatus 110 of FIGS. 3 and 4, the bypass regulator 119 is located approximate to the inlet 113 of the chamber 112 as opposed to the apparatus 10 of FIGS. 1 and 2, in which the bypass regulator 19 is located approximate to the outlet 14 of the chamber 12.

In a variation to that shown in FIGS. 1 to 4, the bypass regulator may comprise two two-way valves, located at either end of the bypass 17, one to a valve being located approximate to the inlet and outlet of the chamber, respectively.

EXAMPLE

A comparative trial was conducted to compare the performance of a conventional block for chemically dosing a stream of fluid against a block according to an embodiment of the present invention. The conventional block was cylindrical in shape. The block according to an embodiment of the present invention was rectangular in shape, having two substantial flat surfaces, substantially parallel to one another. The rectangular block was used to dose a stream of water in an apparatus whereby the water flowed past only the two substantially flat surfaces. The cylindrical block was used to dose a stream of water using a conventional apparatus, whereby the water flowed past the cylindrical surface of the block.

Graphs 5 and 6 show the relative concentration of the active agent in the water after flowing past the conventional cylindrical block and the rectangular block respectively, against the volume of water treated. As can be seen in Graph 5, for the conventional block, the concentration of the active agent in the water decreases in an inverse square relationship.

However, for the rectangular block, Graph 6 shows that the concentration of the active agent in the water is substantially constant throughout its usable treatment life. The concentration of active agent in the water drops rapidly to zero at the end of the treatment life, indicating that the majority of the rectangular block has been dissolved and/or eroded prior to it becoming unusable to satisfactorily dose the water.

In the claims which follows and in the preceding description of the invention, except where the context requires otherwise due to express language or necessary implication, the word "comprise" or variations such as "comprises" or "comprising" is used in an inclusive sense, ie. to specify the presence of the stated features but not to preclude the presence or addition of further features in various embodiments of the invention.

The invention claimed is:

1. An apparatus for housing a block for chemically dosing a stream of fluid flowing past at least one surface of the block, by dissolution and/or erosion of the block, the block consisting of one or more active ingredients and a solid carrier of polyethylene glycol for carrying the one or more active ingredients, the apparatus comprising a chamber for the block to reside in, the chamber having an inlet and an outlet to enable the stream of fluid to flow therethrough, wherein the chamber is shaped to enable the block to reside therein with opposing side walls of the block abutting the side walls of the chamber such that, in use, the at least one surface of the block is dissolved and/or eroded without a substantial change in the area of the at least one surface thereby providing a constant rate of chemical dosing to the stream of fluid for a given flowrate.

2. An apparatus as claimed in claim 1, wherein the chamber is shaped to enable the at least one surface of the block to be positioned approximately perpendicular to the side walls of the chamber when the block resides therein.

3. An apparatus as claimed in claim 1, wherein the chamber is shaped to provide a space next to the at least one surface of the block for the stream of fluid to flow through when the block resides therein.

4. An apparatus as claimed in claim 1, wherein the apparatus also comprises a bypass for allowing some or all of the fluid stream to bypass the chamber.

5. An apparatus as claimed in claim 4, wherein the apparatus also comprises a baffle wall for separating the chamber from the bypass.

6. An apparatus as claimed in claim 4, the apparatus also comprising a bypass regulator for regulating the flow of fluid through the bypass.

7. An apparatus as claimed in claim 6, wherein the bypass regulator is a two-way valve.

8. An apparatus as claimed in claim 4, wherein the apparatus also comprises a mixing well, located prior to an outlet of the apparatus, for mixing fluid from the bypass and the chemically dosed fluid from the outlet of the chamber.

9. An apparatus as claimed in claim 1, wherein the apparatus also comprises a removable end cap for access to the chamber.

10. An apparatus as claimed in claim 1, wherein the apparatus also comprises a retaining mechanism for holding the block in position in the chamber.

11. A system for chemically dosing a stream of fluid, the system comprising:
   a block for chemically dosing the stream of fluid as it flows past at least one surface of the block; and
   an apparatus for housing the block as claimed in claim 1, the block being shaped to enable the at least one surface to be dissolved and/or eroded without a substantial change in the area of the at least one surface.

12. A system as claimed in claim 11, wherein the at least one surface of the block is substantially flat.

13. A system as claimed in claim 11, wherein the block comprises two substantially flat surfaces, parallel to one another.

14. A system as claimed in claim 11, wherein the block is a rectangular prism.

15. A system as claimed in claim 11, wherein the solid carrier is soluble in water.

16. A system as claimed in claim 11, wherein the polyethylene glycol has an average molecular weight of between 1000 and 8000 MW.

17. A system as claimed in claim 11, wherein the one or more active ingredients comprises at least one surfactant for forming a fire retardant foam.

18. A system as claimed in claim 17, wherein the one or more active ingredients also comprises a foam stabiliser.

19. A system as claimed in claim 11, wherein the one or more active ingredients comprise a corrosion inhibitor, and/or at least one detergent, and/or any one or more compounds selected from the group consisting of fertilisers, pesticides, insecticides and herbicides.

* * * * *